(12) United States Patent
Walton et al.

(10) Patent No.: US 9,809,390 B2
(45) Date of Patent: Nov. 7, 2017

(54) GRANULAR MATERIAL SCOOP AND NEAR-VERTICAL LIFTING FEEDER/CONVEYOR

(71) Applicants: Otis Walton, Livermore, CA (US); Hubert J. Vollmer, Tracy, CA (US)

(72) Inventors: Otis Walton, Livermore, CA (US); Hubert J. Vollmer, Tracy, CA (US)

(*) Notice: Subject to any disclaimer, the term of this patent is extended or adjusted under 35 U.S.C. 154(b) by 10 days.

(21) Appl. No.: 15/212,194

(22) Filed: Jul. 16, 2016

(65) Prior Publication Data
US 2016/0325939 A1 Nov. 10, 2016

(51) Int. Cl.
*B65G 33/24* (2006.01)
*B65G 33/14* (2006.01)
*B65G 65/46* (2006.01)

(52) U.S. Cl.
CPC .............. *B65G 33/24* (2013.01); *B65G 33/14* (2013.01); *B65G 65/463* (2013.01)

(58) Field of Classification Search
CPC ........ B65G 33/24; B65G 33/16; B65G 33/12; B65G 65/463; E21B 49/02; E21B 10/43; E21B 10/003; E21B 10/54; E21B 7/005; E21B 7/006; E21B 7/06; E21B 3/00; E21B 7/04; E21B 17/20
See application file for complete search history.

(56) References Cited

U.S. PATENT DOCUMENTS

| 4,202,438 | A | * | 5/1980 | Rotilio | B65G 33/16 198/524 |
| 4,393,609 | A | * | 7/1983 | Persson | B65G 33/12 198/671 |
| 4,742,852 | A | * | 5/1988 | White | B65B 1/12 141/256 |
| 9,334,693 | B2 | * | 5/2016 | Walton | E21B 49/02 |

FOREIGN PATENT DOCUMENTS

| DE | 2931402 A | * | 11/1980 | ............ B65G 33/14 |
| EP | 2669464 A1 | * | 12/2013 | ............ E21B 27/04 |
| JP | 59097914 A | * | 6/1984 | ............ B65G 33/16 |

* cited by examiner

*Primary Examiner* — Mark A Deuble
(74) *Attorney, Agent, or Firm* — Richard Brewster Main; Main Law Cafe

(57) ABSTRACT

An integrated granular-material scoop and near-vertical lifting feeder/conveyor includes special connections and skirts between a bullnose rotating scoop and an open-helical screw that provides the rotations and material lift and evacuation. A conical working-face of the bullnose rotating scoop has symmetrically distributed graters and vents to break loose and force-in granular material from natural deposits and cargo holds. The bullnose rotating scoop and the open-helical screw its attached to move the material into a continuous layer on the inside surface of an outer stationary sheathing. A motor drive attached to the open-helical screw above at the delivery end provides the lifting force necessary.

8 Claims, 3 Drawing Sheets

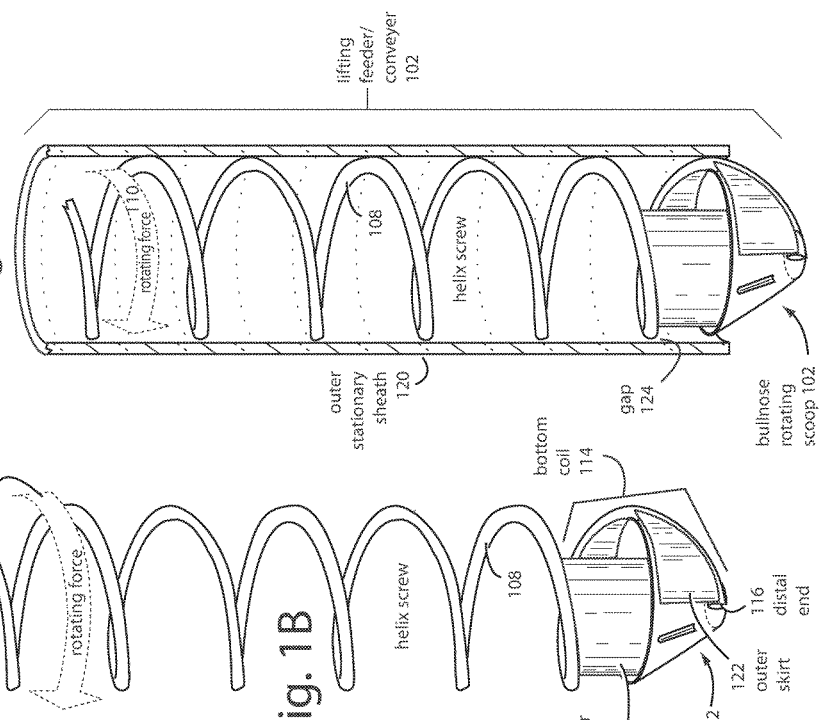

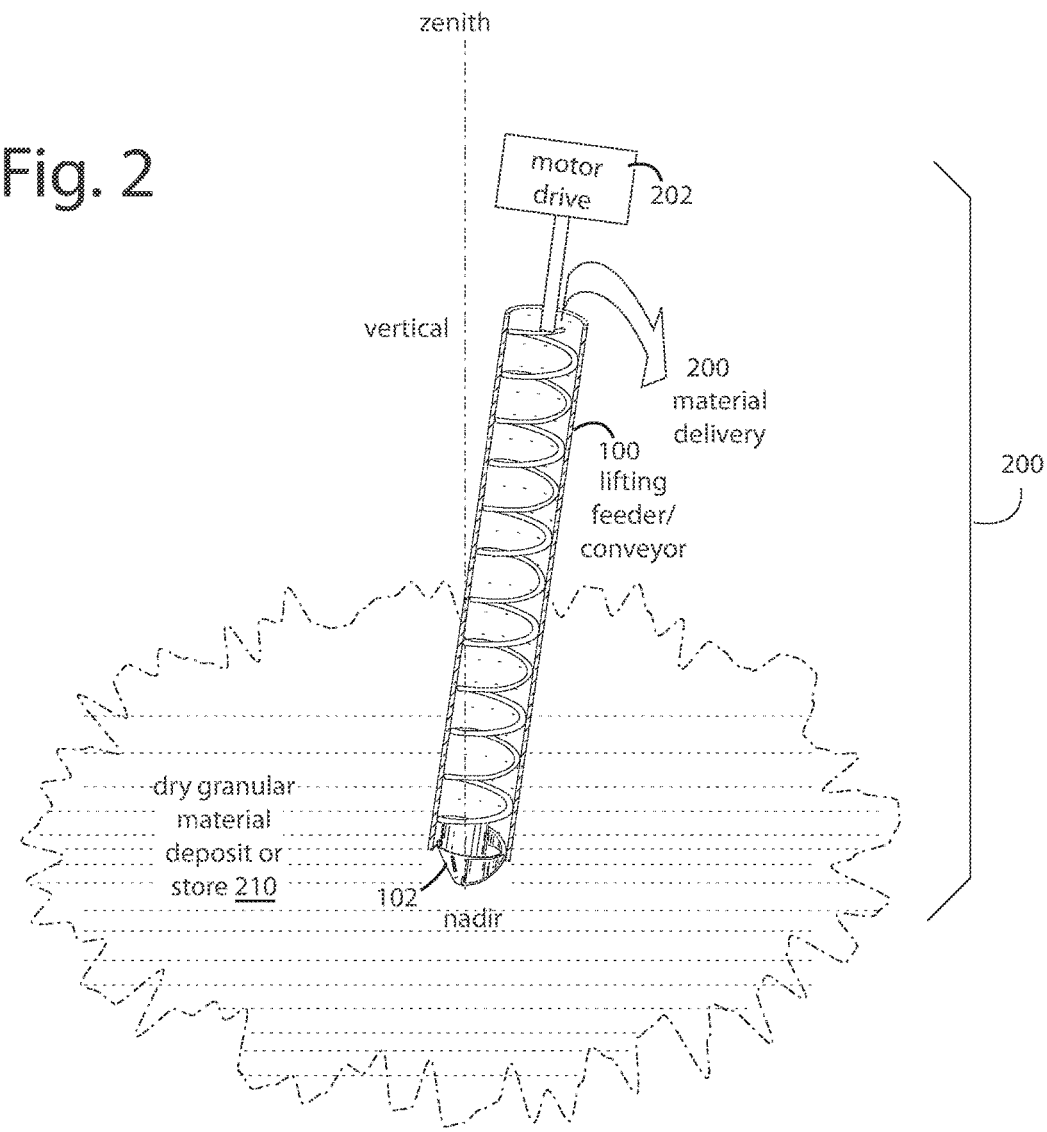

GRANULAR MATERIAL SCOOP AND NEAR-VERTICAL LIFTING FEEDER/CONVEYOR

FEDERALLY SPONSORED RESEARCH/DEVELOPMENT

Figure 3B:
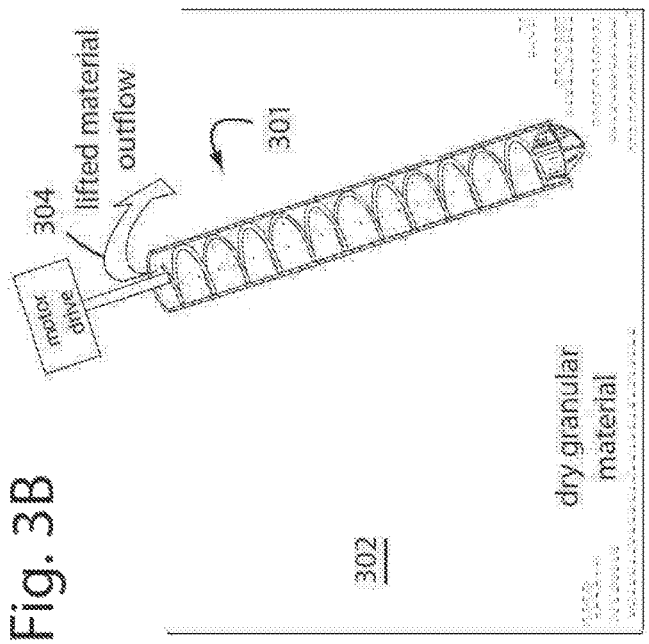

This invention was made with United States Government support under contracts NNX14CK06P and NNX15CK09P awarded by NASA. The Government therefore has certain rights in the invention.

BACKGROUND

1. Field of the Invention

The present invention relates to vertical screw conveyors for vertical lifting of loose granular materials, and more particularly to open helix type flexible tube conveyors without a central shaft that are fitted at their distal ends with a rotating conical scoop with symmetrically distributed radial scoops around its working face.

2. Background

Conventional helix conveyors, screw conveyors, spiral conveyors, auger conveyors, and other flexible screw conveyors typically use a rotating spring steel or stainless-steel flexible screw inside a stationary pipe. The flexible screw inside is driven by an electric motor normally located at a discharge end of such conveyors. This simple design offers advantages over rigid screw conveyors, bucket elevators, drag chain conveyors, aero mechanical conveyors and other equipment intended to transport powder and bulk solid materials under certain conditions and for many materials. But they do have trouble moving, and especially initially feeding, materials vertically straight up.

The trouble starts at the distal end. The material has to be quickly accelerated up to speed high enough for the centrifugal force against the outer wall to create enough friction to keep it from falling, back down. Most commercial open-coil helical screw conveyor systems sold today tilt the whole conveyor, or at least the distal end, to the side to help the distal-end intake and to pack the material into the layer on the wall better.

The intake end of a flexible screw conveyor tube is typically equipped with a charging adapter, a U-shaped trough that connects to the outlet of a hopper or directly to the outlet of process equipment such as a bulk bag discharger, bag dump station, grinder, crusher, screener, blender, reactor or storage vessel of any kind.

Conventional "flexible" conveyors usually have diameters in the two- to four-inch range, and rotate at several hundred RPM. Fast enough that the G-levels developed inside from centrifugal force rises to three to four G's, that is if they are to function well. Even at 2-G's such would barely function. Too much developed centrifugal force causes other problems with stiction. Some suppliers of such conveyors mention having flexible pipes with a maximum diameter of 8-inches. Of course, with lower rotational speeds to keep the centrifugal forces developed inside at optimal and functional levels.

The typical outer casings are usually a very thick plastic tube that can be bent slightly, but are typically quite stationary in use. They are not usually moved around and flexed in different directions. Such bends enables the lifting feeder/conveyor to be positioned in a near vertical orientation, after the tilted entrance region, e.g., to save floor space. If these could be fed effectively at the steeper inclinations that approach vertical, they would probably not need to be bent at all. Anyway, bends have a cost in higher wall loads and wear, and provide very little benefit in return.

Large holds in modern cargo ships are used worldwide to store and transport dry granular materials like grains, cement, ores, and plastics. Pouring these materials into the cargo holds is easy enough, but special dry granular material vertical conveyors are needed to extract them. Specialized ship-unloading screw conveyors with central shafts and vertically oriented are fed by counter rotating scoops that force-feed the lifting feeder/conveyor. These can be get as large as 24-inches in diameter, and can move 2400-tons of bulk material every hour out of the hold of a ship. Siwertell (Cargotel Company, Sweden) is one maker of those big conveyors, and they are in a class by themselves.

In the Siwertell-type vertical screw conveyor a separately powered outer pipe surrounds a stationary conveying tube. The outer pipe has scoops at the bottom that feed material into the conveying screw. The stationary conveying tube between the open-helical screw 108 and the outer scoops stops one flight short of the bottom end, and counter rotating scoops bring material into the reach of the open-helical screw.

Not so different in construction from the conveyors described here are devices proposed for use in extraterrestrial missions that plow into regolith and pull up grains and powders of the regolith. These require a special plow-head with grater-like scoops and ways to move the materials in reduced gravity environments.

Conventional vertical conveyors to plow and lift dry granular materials generally need some horizontal tilt at their plow-tip ends, or need to be deeply submerged in a granular material, to get the material to fill inside the screw and move up to the surface. We describe an improvement of such a mechanism in our U.S. Pat. No. 9,334,693, issued May 10, 2016. Its flexible auger screw uses a central driveshaft in the main pipe and both external scoops and internal lifts radially arranged around a plow-head nose shell.

Another practical problem in reduced-gravity environments is that cohesive materials can sometimes be a problem to transport from a collection site to a collecting and processing site. Granular solids cannot simply be pushed along inside a cylinder with a piston, because frictional loads in a granular slug pushed along a pipe increase exponentially with the length of the slug. So screw conveyors have been conventionally used for transporting free-flowing granular solids over modest distances.

The present inventor, Otis Walton, describes a few centrifuging conveyors for moving granular solid materials over a wide range of cohesion strengths, in U.S. Pat. No. 8,607,966, which issued Dec. 17, 2013. A screw auger is fixed to the outside surface of a fixed inner shaft. A matching, but rotating outer pipe is slipped over the outer diameter of the auger screw. The outer pipe is rotated at a high enough rate to induce granular materials introduced at an input end to cling to the outer pipe's interior walls. The auger screw will act on these clinging layers to move the granular material along to an outlet end, without clumping or clogging.

These centrifuging conveyors need feeders that can introduce granular solid materials at an input end that are boosted in speed enough to have the necessary centrifugal forces come into action. Vertical and steeply inclined orientations need specially adapted scoop-type feeders, as illustrated by FIG. 4B in U.S. Pat. No. 8,607,966. Granular solid material is scooped into bullnose rotating scoop 102 409 externally louvered scoops 410. Axially tapered and tilted inner blades 411 ramp up and boost the introduced materials to near the speed of rotation of bullnose rotating scoop 102 409 to start the materials moving along toward the outlet end in the layers clinging to the interior walls.

The outer pipe rotates on its axis at a rate high enough for even cohesive materials to form in layers on the interior walls. Curved auger screw blades that are either stationary or rotated at a different rate move the materials along inside. As the incoming materials are fed in, a difference in the rotational rates of the interior walls and the set angles of the several blades will dictate how fast the cohesive material is moved along the walls of the interior.

The present invention improves over conventional screw-auger conveyors with stationary outer pipes. Conventional screw-auger conveyors rotate only an inner helical screw inside of the stationary pipe. Conventional screw augers typically operate in one of two modes, in orientations where the axis is near horizontal they typically operate with slow rotation of the inner screw, and they function by material moving up the rising face of the rotating helical screw and then sliding back down its advancing face-inducing axial displacement. These slow-rotating augers, whether they are open-coil augers, or central-shaft screw-augers, will stop working if the screw axis is tilted up to steep angles, or in a near-vertical orientation. Near-horizontal auger conveying, at these low rotation rates, depends on gravity to help convey dry granular solids.

Conventional screw-augers can, however, be operated in such a manner that they convey material vertically, but in this case higher rotation rates are involved and the flow modes and mechanisms that move the materials along inside up the length are significantly different from those operating in slowly rotated screw conveyors. Gravity is no longer helping and must be overcome instead.

In this vertical conveying mode the fast-rotating screws fling the material out to the outer interior walls where friction keeps it from sliding back down, and it can be pushed up along the wall by the helical screw auger as it rotates. The friction of the material moving in a spiral upward path along the outer wall also minimizes the amount of material that falls back down any gap that exists between the open-helical screw 108 and wall. High rotation rates are needed to create the high centrifugal force required for this mode of near-vertical screw-conveying to function. However high rotational rates create problems at the bottom inlet feeds.

A majority of heavy industrial vertical screw conveyor are sold with attached, but separately powered, horizontal feed augers to force-feed the inlet. Other vertical conveying systems have scoops on separately rotating outer pipes to force materials into the conveying systems. Feeding vertically oriented conventional screw-auger conveyors is difficult, and few satisfactory solutions have been developed other than the separate horizontal feed augers.

Some attempts to get good enough inlet feeds for vertical screw conveyors have a retracted outer casing at the distal end that exposes several of the open-helical screw 108 flights. This arrangement can act as a feeder. But screw extensions out beyond the end of the casing can actually fling material out and away from the open-helical screw 108 entry. The centrifugal effects in the swirling material are responsible for feed-starving that gets worse if the rotation rates increase, or gravity is reduced.

Vertical conveying tests under lunar gravity conditions aboard NASA's reduced gravity aircraft with lunar stimulants proved fast rotating screws would feed-starve and not be very effective.

There is a general need therefore for a device that can quickly feed enough material into vertical screw-auger conveying systems. And in the field of space exploration and in-situ resource utilization, there is a need for devices to extract subsurface materials through small entry holes into the surface of the moon or Mars, e.g., to preserve volatiles from Space. A plow-head feeder is needed for connection to flexible conveying systems when excavating materials. And one that can convey the materials to the surface through a small sealed inlet hole, and thus meet the needs of future space exploration missions.

SUMMARY OF THE INVENTION

Briefly, integrated granular-material scoop and near-vertical lifting feeder/conveyor embodiments of the present invention include special connections and skirts between a bullnose rotating scoop and an open-helical screw that provides the rotations and material extraction. A conical working-face of the bullnose rotating scoop has symmetrically distributed graters and vents to break loose and force-in granular material from natural deposits and cargo holds. The bullnose rotating scoop and the open-helical screw it's attached to accelerate the material into a continuous layer moving along an upwardly-directed helical flow-path and covering the entire inner surface of an outer stationary sheathing. A motor drive attached to the open-helical screw above at the delivery end provides the lifting force necessary.

These and other objects and advantages of the present invention will no doubt become obvious to those of ordinary skill in the art after having read the following detailed description of the preferred embodiments which are illustrated in the various drawing figures.

IN THE DRAWINGS

FIGS. 1A, 1B, and 1C are exploded assembly and perspective view diagrams showing how the essential parts of a lifting feeder/conveyor of the present invention come together into a functioning unit. In FIGS. 1B and 1C the inner skirt may appear to have a smaller radius than the top rim of the rotating bullnose scoop, but they are in fact the same in radius.

Figure 3A:
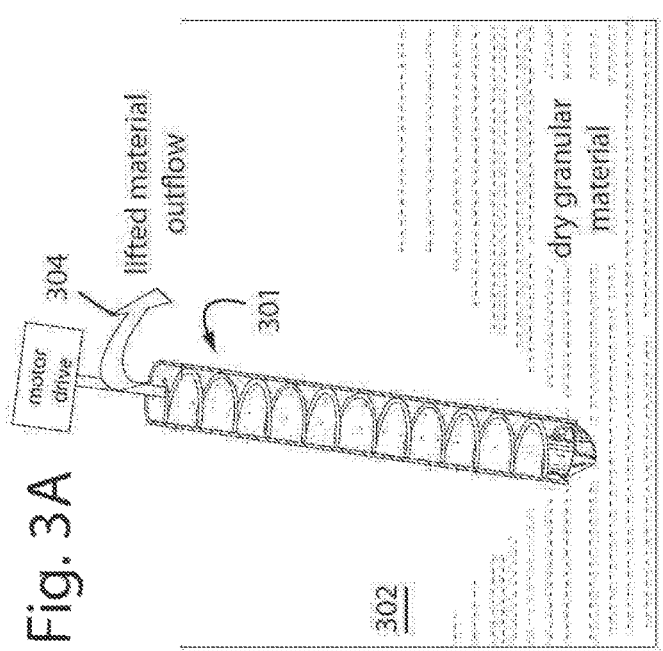

FIG. 2 is a schematic diagram of a vertical lift screw conveyor using the lifting feeder/conveyor embodiment of FIGS. 1A-1C; and FIGS. 3A and 3B are a time series of the operation of a lifting feeder/conveyor embodiment of FIGS. 1A-1C and FIG. 2 to completely remove material laying in a container by moving an inlet end around inside to pick up material from the whole of the bottom area.

DETAILED DESCRIPTION OF THE PREFERRED EMBODIMENT

Feeder/conveyor embodiments of the present invention are configured to collect, accelerate and convey regolith and other dry granular materials near vertically out of their natural deposits and cargo holds. A distal end is fitted with a rotating bullnose scoop 102 and forward facing grater scoops to collect and accelerate the regolith and other dry granular materials up to the inner wall of the helical screw auger. If the materials are not loose enough to flow into the center, the feeder/conveyor can be swept around inside a cavern from a single central position above, or can traverse over the lateral range of a cargo hold.

Embodiments of the present invention would not ordinarily be described as a drill. Rather, they aggressively collect material from a central coring that is slightly smaller in diameter than an outer sheath pipe diameter. It would there be difficult to "drill" into stiff deposits that didn't yield easily to the forward shoulders of the outer sheath pipe. Here, we prefer to refer these embodiments as granular material feeder/conveyors. And their particular talents are in steeply-inclined uses with open-coil helical screw conveyors.

The illustrating of the preferred embodiment proved to be challenging. So we present a series of Drawings in FIGS. 1A-1C that represent how the pieces in FIGS. 1A and 1B are combined to form the more complete assembly of FIG. 1C. A granular material scoop and near-vertical lifting feeder/conveyor 100 comprises a bullnose rotating scoop 102 with a symmetrically disposed conical working face 104. A number of symmetrically distributed graters and vents 106 are sized and arranged to break loose and force-in granular material laying beneath it that exist in natural deposits and the cargo holds of ships, other transport containers, and warehouses. The symmetrical distribution and sizing of the graters and vents 106 is important to the elimination of vibrations, wobbling, and undulations, especially at the conical working face 104. The apex and circular base of the conical working face 104 must therefore be concentric to the axis of rotation of an open-helical screw 108 that provides a rotating force 110.

Such rotating force 110 translates down to the bullnose rotating scoop 102. A second equally important aspect of the rotating force 110 is it provides a material lift-and-evacuation function to any of the granular materials forced-in at the bottom tip. The rotating force 110 is typically generated by a motor coupled to the open-helical screw 108 at a delivery end at the top. In regolith collecting applications on extraterrestrial bodies, such motor would be above the ground surface.

A partial cylindrical "inner" skirt 112 is fastened between a bottom coil 114 above a distal end 116 of the open-helical screw 108 and an upper circular rim 118 of the bullnose rotating scoop 102. Such provides mechanical support between them. The partial cylindrical inner skirt 112 further provides an initial material containment of forced-in granular materials. An outer stationary cylindrical sheathing 120 fully encloses a length of open-helical screw 108 and allows a protrusion of the bullnose rotating scoop 102. The whole granular material scoop and near-vertical lifting feeder/conveyor 100 is typically 100-diameters or more in length.

A partial cylindrical "outer" skirt 122 is welded or otherwise fastened between the bottom coil 114 at a distal end 116 of the open-helical screw 108 and the upper circular rim 118 of the bullnose rotating scoop 102. Such provides a boosted material containment of forced-in granular materials. The partial cylindrical outer skirt 122 provides additional feeding capability as described in more detail later.

The outer stationary cylindrical sheathing 120 can advantageously be made to be flexible and steerable. The open-helical screw 108 is typically made of stainless steel, and is able to flex along with the outer stationary cylindrical sheathing 120. The fit between the two allows the open-helical screw 108 to be turned inside, and generally includes enough radial-direction gap that a typical conveyed particle would not become wedged between the screw and the outer casing. The inclusion of such a gap improves robustness of operation.

FIG. 2 shows an application 200 in which a motor drive 202 is connected to a lifting feeder/conveyor 100 at a top end of its open-helical screw 108. Such provides the rotational force 110 and must be sufficient for the breaking loose and the forcing-in the granular materials laying just below and contacting the bullnose rotating scoop 102.

The application 200 is used to collect and lift dry granular materials laying below at nadir in a natural deposit or store 210. For example, the grain storage cargo holds of ships, or the natural deposits of regolith on extraterrestrial bodies in Space. The lifting feeder/conveyor 100 is capable of being operated at near vertical or even vertical, unlike conventional open-coil helical-screw conveyors.

A method embodiment of the present inventions enables the collection and lifting of granular materials from natural deposits, warehouse stores, transport containers, and ship cargo holds. The method includes scraping loose any granular-material laying in natural deposits and cargo holds vertically from above with bullnose rotating scoop 102. Then, accelerating the granular-material that was scraped loose with a number of symmetrically distributed graters and vents disposed in a conical face of the bullnose rotating scoop 102 and moving up to the conveyor section. Then containing, forming, and controlling movement of loose granular-material onto the inside surface of a partial cylindrical skirt 112 and/or 122 fastened between a bottom coil 114 at a distal end 116 of an open-helical screw 108 providing a rotation force 110 and material lift. Then conveying the loose granular-material inside into a continuous layer moving helically up the sheathing wall, lifted by a turning of the open-helical screw inside a stationary outer sheathing.

Such requires a sizing and arranging of the outer stationary cylindrical sheathing 120 to fully dispose within its full length the open-helical screw 108, and positions the bullnose rotating scoop 102 to protrude from a bottom end. And in operation, positioning the bottom end to be essentially nadir to a top delivery end of the stationary outer sheathing, and collecting the granular material from above where it lays in natural deposits, transport containers and cargo holds.

FIGS. 3A and 3B represent an application 300 in which a lifting feeder/conveyor 301 is used to empty material from a transport container of significant lateral area. It is assumed that the top motor drive has separate controls that can both translate and tilt the conveyor. Utilizing those controls the conveyor can collect material from the entire container volume either by lateral translation or by utilization of tilting and vertical displacement to cover the entire bottom surface of the container. The conveyor is capable of collecting material and conveying it to the exit in vertical orientation, or when it is tilted at almost any angle. The lifting feeder/conveyor 301 is swept, twisted and turned to collect material from a wide fan area below the collection point at the exit. The lifted material outflow 304 delivers the material to other processes or conveyors as desired.

In general, the bullnose rotating scoop 102 attaches to the open-helical screw 108 at its end. The open-helical screw 108 is the means by which torque is delivered to move material and rotate the bullnose rotating scoop 102. Various means of securely fastening the bullnose rotating scoop 102 to the open-helical screw 108 can be employed, such as welding, soldering, brazing, gluing or machine-screw fasteners. The inner skirt 112 is a convenient means of accomplishing the attachment, and such distributes the loads around a larger portion of the open-helical screw 108.

Unfortunately there is nothing much at play to move material up the walls of the inner skirt 112, except any momentum the material gains as it enters the skirt after leaving the bullnose rotating scoop 102. Such momentum can carry the material a short distance slightly greater than one skirt-radius upward along the axis. The inner skirt 112 delivers material to the top surface of the open-helical screw 108, but if the skirt material is a perforated sheet, the material that passes through will also get picked up by the rotating helical screw.

The inner skirt 112 may appear to be a fundamental part of moving material axially up to the open-helical screw 108, but as soon as any material gets inside the outer stationary sheath 120 above rim 118, the material will be picked up and conveyed by the rotating helical screw 108. The primary function of the inner skirt 112 is a means of structural attachment to the helical screw 108 that is not biased or skewed to one side of the open-helical screw 108. The torque transmitted to the bullnose rotating scoop 102 is better distributed around the circumference of rim 118. The inner skirt could be comprised of multiple sections of a cylindrical sheet, with vertical open gaps or slots between the individual sections of the cylinder. FIGS. 1B and 1C show an inner skirt made of two sections, each covering approximately one-quarter to one-third of the circumference of the cylinder, with a gap between them that allows material to flow out to the outer stationary sheath 120.

Any extension of the helical screw 108 beyond the point where the bullnose rotating scoop 102 contacts the open-helical screw 108 might move a small amount of material into the conveying line, but such will mostly just throw material away from the open-helical screw 108 area due to momentum. There is therefore little reason to extend the open-helical screw 108 beyond the point where it contacts rim 118 of bullnose rotating scoop 102.

However, if the open-helical screw 108 were to be extended a short distance beyond the end of outer stationary sheath 120, and had a short outer skirt 122 attached to it as shown in FIG. 1B, then such can function like an auxiliary scoop that brings material into the lifting feeder/conveyor. If such outer skirt 122 is too lengthy, e.g., the axial extent is greater than a length equivalent to one outer-radius of the open-helical screw 108, then the frictional forces on the walls of bullnose rotating scoop 102 and the open-helical screw 108 will tend to plug up, and block the flow through bullnose rotating scoop 102. A scoop that was closer to one diameter tall was tested and it was ineffective in picking up material.

Rigid attachments of the inner bullnose rotating scoop 102 to the open-helical screw 108 provide a convenient location to support the top of such an outer scoop wall. E.g. along the rim 118 of bullnose rotating scoop 102. But such attachment cannot close off the top opening into the helical screw conveying region. The outer skirt 122 can be made as shown in FIG. 1B, without any support at the top, but preferred embodiments include a stiffening means to increase resistance to deformation of the outer skirt 122. Such as by attaching it, at its top, to a section of a supporting ring attached to the outside of the top lip of the bullnose rotating scoop 102.

The outer skirt 122, advances significantly over the prior art.

With reference to FIG. 1C, there appears to be a small gap 124 as shown between the open-helical screw 108 and the outer stationary sheath 120. Most would assume that any gap 124 would degrade the conveying performance. But, including such gap 124 reduces the torque needed in rotating force 110, and the consequential reductions in power consumption by the motor from usually more than makes up for the conveying efficiency losses due to material raining down through the gap 124. Of course there are limits to the gap size for proper functioning, but in general, larger gaps improve robustness by reducing jamming and lowering friction loads, but also adversely impact efficiency due to the resulting material leakage. For many applications, robust operation is at least as important as energy efficiency.

Both skirts 112 and 122 prevent newly entering materials from escaping upward lifting by open-helical screw 108. The dry granular materials have nowhere to go but up because of these skirts.

The inner skirt 112 should be solid sheet metal, but can have large perforations. It serves two functions; it is primarily a means to connect the bullnose rotating scoop 102 to the open-helical screw 108. As long as its axial extent is less than a radius in magnitude, it can be solid and may provide extra oomph in transporting material further up before dumping it on the open-helical screw 108. If the height is increased to more than one skirt radius, there must be a means to let the granular material to go through the skirt while maintaining its structural role of supporting the circumference of the top of the funnel. The illustrations here show them as partial sections of a cylinder. But they could alternatively just be a cylinder that has large holes above one radius axial distance above rim 118.

A perforated cylindrical shell with holes is preferred, with perforations each large enough to exceed the largest particles expected to be conveyed by 2-3 times. But anything larger than even one-particle diameter will probably keep jamming of the material shearing over it from being a problem. A cylindrical shell would be an easy method of attaching bullnose rotating scoop 102 to an open coil. As opposed to requiring the open coil to be formed into a flat circle at the end like an automobile overhead-valve spring. And the method described here allows its use as an extra material scoop.

Having only one outer scoop on a feeder makes it non-symmetric and may put bending loads on it or other asymmetric loading that might be undesirable. Using the bullnose rotating scoop 102 available as a support, a second short scoop with a section of a second helical coil could be attached 180-degrees opposite to the one that is an extension of the main open helical auger. This would just wrap around about one-half of a circumference and stop. Thus delivering material into the outer stationary sheath 120 on the other side. As the open-helical screw 108 comes around, it would pick up this material and lift it up along the conveyor with whatever else was inside the outer stationary sheath 120. It would probably not be possible to have a second short scoop-like section that stopped right at rim 118. The scoop should stop there but the screw it is attached to would probably need to be extended some distance up the outside of the inner skirt in order to achieve sufficient structural strength, with the screw attached to the inner skirt over this extended distance.

The embodiments described here primarily focus on uses as a feeder for conveying granular materials, especially in feeding open coil helical screws used in steeply inclined or even vertical orientations.

Open coil screws may lose some efficiency when vertically oriented because the materials inside being transported can fall back down through the central opening. Centrifugal force tends to keep the material being conveyed on the outer sheath wall, and the conveyors operate with a hollow core region along their entire length. Some commercial open-coil screw manufactures suggest placing a stationary pipe in the center to control any potential fallback in the hollow core. Several manufacturers of "flexible conveyors" describe their applications as needing to start out at a 45-degree incline before gently bending up to vertical runs. In practice, most actual applications avoid any bending, because bends will cause the relatively stiff helical coil to rub against the flexible outer pipe wall. The resulting friction takes energy and causes component wear. As a result, no conventional products seem really to be able to feed in any orientation approaching near-vertical.

Bullnose rotating scoop 102s with grater-blade like scoops are connected to cylindrical tubes that just fit inside an open helical coil. That helical coil then feeds material up the inner pipe when rotated. Such inner pipe is rigidly attached by welding it to the helical coil.

The inner rotating structure is abbreviated at the point it encounters the helical coil, inside an outer stationary outer sheath 120. The total vertical extent of this inner pipe-like shell is only about one inner-pipe-radius, which is about as far as inertia can move the materials in before they really slowdown. If a bullnose rotating scoop 102 is attached to a rotating pipe with no other means of conveying, materials will move a little less than a diameter into the pipe before stopping. By abbreviating the inner skirt at less than one radius in total axial length, the materials flowing inside of it should fall off the end of the inner cylinder and onto the rotating helical coil screw so they can then be conveyed vertically up inside the stationary outer stationary sheath 120.

Bullnose rotating scoop 102 and its short cylindrical pipe-like extension does not impart significant velocity to material outside the feeder. But once the material that gets into bullnose rotating scoop 102 it moves both radially and axially and spreads out to the circumference of the inner skirt due to a combination of inertial, centrifugal, and Coriolis forces; axial momentum then carries it to the start of the helical screw rotating inside its housing. If the open helix extends beyond the housing in a steeply inclined orientation, it will throw any material it contacts out by centrifugal force. If that occurs, not very much will convey into the housing above.

If a helical screw conveyor is buried deep enough in granular material, it can self-feed. But at shallow insertions or burial depths into material beds, the unit will not self-feed. That is why all of the commercial versions of open-coil helical screw conveyors start at about a 45-degree incline, with a half-pipe on the bottom and material piled on top to resist the centrifugal action trying to throw material radially away from the open-helical screw 108. Screws with a central shaft have similar problems, but the issues seem to be quite a bit more severe for the open coil screws—since none are sold to pick up material vertically, or at steep inclinations. Our target application would be more than just exactly vertical, and should include orientations that have steep inclination of the feeder.

Commercial flexible conveyors are usually in the 2-inch to 4-inch size range and are rotated at several hundred RPM. The g-level from the centrifugal force inside against the outer walls needs to be on the order of 3-4 Gs for them to function right. At 2× gravity they would barely function. Some suppliers mention a maximum diameter of 8-inches. The outer casing is usually a very thick plastic tube that can be bent slightly (the pictures of installed units look like they are typically stationary (so that they would not be moving around and flexing in different directions). The flexing appears to be primarily so they can get to a near vertical orientation (to save floor space). If they could be fed effectively at a steep inclination, they would probably not use a bend in the conveying (bends add high wall loads and wear and little benefit).

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A granular material scoop and near-vertical lifting feeder/conveyor, comprising:
    a bullnose rotating scoop with a symmetrically disposed conical working face;
    a number of symmetrically distributed graters and vents sized and arranged to break loose and force-in granular material laying below in natural deposits, transport containers and cargo holds;
    an open-helical screw that provides a rotating force to the bullnose rotating scoop and a material lift-and-elevation to any forced-in granular materials;
    a partial cylindrical skirt fastened between a bottom coil at a distal end of the open-helical screw and an upper circular rim of the bullnose rotating scoop, and that provides mechanical support between them, and that further provides an initial material containment of forced-in granular materials; and
    an outer stationary cylindrical sheathing in which is disposed a full length of the open-helical screw and from which protrudes the bullnose rotating scoop.

2. The granular material scoop and near-vertical lifting feeder/conveyor of claim 1, further comprising:
    a flexible outer stationary cylindrical sheathing; and
    a motor drive connected to a top end of the open-helical screw, and that provides a rotational force sufficient for the breaking loose and forcing-in the granular materials laying below it.

3. The granular material scoop and near-vertical lifting feeder/conveyor of claim 1, further comprising:
    an outer skirt attached to the bottom end of the open-helical screw and bullnose rotating scoop and that functions as an auxiliary scoop.

4. The granular material scoop and near-vertical lifting feeder/conveyor of claim 3, further comprising:
    a second outer skirt attached to the bottom end of the open-helical screw and bullnose rotating scoop that functions as another auxiliary scoop and balances out a non-symmetry that would otherwise exist in the grating action of the whole.

5. A method for the collection and lifting of granular materials from natural deposits, transport containers and cargo holds, comprising:
    scraping loose vertically from above any granular-material laying in natural deposits, transport containers, and cargo holds with a bullnose rotating scoop;
    packing the granular-material inside that was scraped loose by a number of symmetrically distributed graters and vents disposed in a conical face of the bullnose rotating scoop;
    containing, forming, and controlling an initial layer of loose granular-material on the inner wall of a partial cylindrical skirt fastened between a bottom coil at a distal end of an open-helical screw providing a rotation force and material lift.

6. The method of claim 5, further comprising:
    conveying the loose granular-material inside in a continuous layer of material on the inner wall of a stationary outer cylindrical sheathing and lifted by the turning of the open-helical screw inside the stationary outer sheathing.

7. The method of claim 5, further comprising:

sizing and arranging the outer stationary cylindrical sheathing to fully dispose within its full length the open-helical screw, and positions the bullnose rotating scoop to protrude from a bottom end.

8. The method of claim 7, further comprising:

positioning the bottom end during use to be essentially nadir to a top delivery end of the stationary outer sheathing, and collecting the granular material from above where it lays in natural deposits, transport containers, and cargo holds.

* * * * *